United States Patent [19]
Ono et al.

[11] Patent Number: 5,859,914
[45] Date of Patent: Jan. 12, 1999

[54] ACOUSTIC ECHO CANCELER

[75] Inventors: Yoshihiro Ono; Shigeru Ono, both of Tokyo, Japan

[73] Assignee: NEC Corporation, Japan

[21] Appl. No.: 897,066

[22] Filed: Jul. 18, 1997

[30] Foreign Application Priority Data

Jul. 23, 1996 [JP] Japan .................................. 8-193059

[51] Int. Cl.$^6$ .................................................. H04B 3/20
[52] U.S. Cl. .......................... 381/66; 379/410; 381/71.1
[58] Field of Search .............................. 381/66, 61, 94.1, 381/93.3, 71.1; 379/406, 410, 409

[56] References Cited

U.S. PATENT DOCUMENTS

| | | | |
|---|---|---|---|
| 4,956,838 | 9/1990 | Gilloire | 379/410 |
| 5,272,695 | 12/1993 | Makino | 379/410 |
| 5,561,668 | 10/1996 | Genter | 379/410 |
| 5,566,167 | 10/1996 | Duttweiler | 379/410 |

FOREIGN PATENT DOCUMENTS

| | | |
|---|---|---|
| 443547 | 8/1991 | European Pat. Off. . |
| 719028 | 6/1996 | European Pat. Off. . |
| 91-11060 | 7/1991 | WIPO . |

OTHER PUBLICATIONS

A. Sugiyama, "An Adaptive Intersubband Tap Assignment Algorithm For Subband Adaptive Filtering With A Colored Input", 1994 Spring General Meeting of the Electronic Information and Communication Society of Japan, A–172.

*Primary Examiner*—Minsun Oh Harvey
*Attorney, Agent, or Firm*—Ostrolenk, Faber, Gerb & Soffen, LLP

[57] ABSTRACT

The invention provides an acoustic echo canceler which realizes sufficient echo suppression processing on an auditory sense which matches with an amount of calculation and realizes a good speech quality. The acoustic echo canceler includes a first analysis filter bank for dividing a reception signal into a plurality of sub-bands, a plurality of adaptive filters for individually producing false echo signals from the reception signal after divided into the sub-bands, a second analysis filter bank for dividing an input signal into a plurality of sub-bands, a plurality of subtractors for subtracting the false echo signals corresponding to the sub-bands from the input signal after divided into the sub-bands, and a synthesis filter bank for composing outputs of the subtractors. The acoustic echo canceler further includes a band information calculation section for estimating influences of the echoes for the individual sub-bands and determining a priority order based on the estimation. Each of the adaptive filters determines processing to be executed thereby based on the priority order.

10 Claims, 7 Drawing Sheets

ACOUSTIC ECHO CANCELER

BACKGROUND OF THE INVENTION

1. Field of the Invention

This invention relates to an acoustic echo canceler of the band division type, and more particularly to an echo canceler for cancelling echoes produced by sound coupling in a remote conference system or a hand-free telephone set.

2. Description of the Related Art

An acoustic echo canceler is an apparatus which includes an adaptive filter for identifying a transfer function between a loudspeaker and a microphone, and produces an error echo signal using an echo path identified by the adaptive filter and then subtracts the error echo signal from an input signal from the microphone to cancel echo transmitted from the loudspeaker to the microphone.

Ordinary acoustic echo cancelers endeavor to cancel echoes using a single adaptive filter. However, since an acoustic signal is a signal having a deviation in energy distribution on a frequency band, the ordinary acoustic echo canceler is disadvantageous in that, with a single adaptive filter, echoes cannot be suppressed sufficiently because of a delay in convergence or a like cause.

Thus, as an acoustic echo canceler which solves the disadvantage just described, a sub-band echo canceler has been proposed which divides an acoustic signal band into a plurality of frequency sub-bands and echo cancellation is performed for each of the sub-bands. In the sub-band echo canceler, since an adaptive filter is driven with a narrow band width, a plurality of adaptive problems with a frequency band deviation of an acoustic signal reduced are solved.

An example of a conventional sub-band echo canceler (wherein the band division number=4) is shown in FIG. 7. It is to be noted that the sub-band echo canceler is based on "An Adaptive Intersub-band Tap Assignment Algorithm for Subband Adaptive Filtering with A Colored Input" proposed by Sugiyama in the 1994 Spring General Meeting of the Electronic Information and Communication Society of Japan, A-172.

Referring to FIG. 7, in a room such as a council-room, a microphone MIC for transmission of speech and a loudspeaker SP for reception of speech are provided in order to perform a remote conference. A reception signal 2 transmitted from a remote transmitter-receiver not shown and inputted to a reception side input terminal not shown is converted into an acoustic signal (voice) by the loudspeaker SP and sounded in the room. Then, the acoustic signal is received by the microphone MIC via echo paths. Consequently, an input signal 1 from the microphone MIC includes not only a transmission signal of voice of a speaker or the like but also echo signals based on the voice from the loudspeaker SP.

The input signal 1 and the reception signal 2 from the microphone MIC are inputted to analysis filter banks 801 and 802, respectively. Each of the analysis filter banks 801 and 802 divides a signal inputted thereto into four sub-band signals using four band-pass filters 810 to 813 or 830 to 833 ($F_0$ to $F_3$, $F_0$ to $F_3$). The resulting sub-band signals undergo sampling of data thereof by down samplers 820 to 823 or 840 to 843, whereafter they are outputted as sub-band signals 10 to 13 or 20 to 23 from the analysis filter bank 801 or 802.

Adaptive filters ($ADF_0$ to $ADF_3$) 100 to 103 corresponding to the sub-band signals 20 to 23, respectively, are connected to the output side of the analysis filter bank 802.

The adaptive filters 100 to 103 effect learning of filter coefficients independently of each other and filter the sub-band signals 20 to 23 inputted thereto to produce false echo signals of the individual band components.

Here, an adaptive filter tap allocation control section 1000 observes information 2000 to 2003 of square sums of tap input signals and tap coefficients of the adaptive filters 100 to 103 and output control signals so as to interchange filter taps of the adaptive filters with each other in order to minimize residual echoes in the individual sub-bands.

The false echo signals outputted from the adaptive filters 100 to 103 are inputted to subtractors 200 to 203, respectively. Also the sub-band signals 10 to 13 from the analysis filter bank 801 are inputted to the subtractors 200 to 203, and the false echo signals are subtracted from the corresponding sub-band signals. Subtraction result signals 30 to 33 corresponding to the sub-bands are inputted to a synthesis filter bank 901.

The synthesis filter bank 901 effects data compensation for the subtraction result signals 30 to 33 inputted thereto with up samplers 920 to 923 (insertion of 0 in place of the sampled out data) and then synthesizes a signal of the original band using band-pass filters 910 to 913 ($G_0$ to $G_3$) and an adder. The synthesized signal of the original band is outputted as a transmission signal 3 from the synthesis filter bank 901.

In this manner, in the sub-band echo canceler, echo signals included in the input signal 1 from the microphone MIC are suppressed with the false echo signals and a transmission signal which includes only a transmission speech signal is transmitted to the remote transmitter-receiver.

In the conventional sub-band echo canceler described above, an adaptive filter is used for each of a plurality of divisional sub-bands. However, a same algorithm is used by all of the adaptive filters. Therefore, the conventional sub-band echo canceler is disadvantageous in that cancellation of echoes on an auditory sense which matches with an amount of calculation cannot be realized.

SUMMARY OF THE INVENTION

It is an object of the present invention to provide an acoustic echo canceler which realizes sufficient echo suppression processing on an auditory sense which matches with an amount of calculation and realizes a good speech quality.

In order to attain the object described above, according to the present invention, there is provided an acoustic echo canceler, comprising a first analysis filter bank for dividing a reception signal to be converted into an acoustic signal by a loudspeaker into a plurality of sub-bands, a plurality of adaptive filters for individually producing false echo signals from the reception signal after divided into the sub-bands by the first analysis filter bank, a second analysis filter bank for dividing an input signal from a microphone, which is provided at a position at which the microphone can detect the acoustic signal as echoes, into a plurality of sub-bands same as the first-mentioned sub-bands, a plurality of subtractors for subtracting the false echo signals corresponding to the sub-bands from the input signal after divided into the sub-bands by the second analysis filter bank, a synthesis filter bank for synthesizing outputs of the subtractors, and a band information calculation section for estimating influences of the echoes for the individual sub-bands and determining a priority order based on the estimation, each of the adaptive filters determining processing to be executed thereby based on the priority order.

The band information calculation section may include a first power spectrum calculation section for calculating a power spectrum of the input signal, a second power spectrum calculation section for calculating a power spectrum of the reception signal, a first signal distribution deviation calculation section for calculating a distribution of energy of the input signal for the individual sub-bands based on an output of the power spectrum calculation sections, a second signal distribution deviation calculation section for calculating a distribution of energy of the reception signal for the individual sub-bands based on an output of the second power spectrum calculation section, a plurality of subtractors for calculating differences between the energy of the input signal and the energy of the reception signal for the individual sub-bands, a first priority order determination section for determining a first priority order based on outputs of the subtractors, a second priority order determination section for determining a second priority order based on outputs of the second signal distribution deviation calculation section, and a third priority order determination section for determining a final priority order based on the first priority order and the second priority order.

Or, the band information calculation section may include a subtractor for calculating a difference between the input signal and a second error echo signal different from the first-mentioned error echo signal, an auxiliary adaptive filter for referring to an output of the subtractor to update the filter coefficients and producing the second error echo signal from the reception signal, a discrete Fourier transform section for discrete Fourier transforming the filter coefficients, a plurality of coefficient addition sections for adding outputs of the discrete Fourier transform section for the individual sub-bands, and a priority order determination section for determining a priority order based on outputs of the coefficient addition sections.

Or else, the band information calculation section may include a plurality of first power calculation sections for individually calculating powers of the input signal after division into the sub-bands, a plurality of second power calculation sections for individually calculating powers of the reception signal after division into the sub-bands, a plurality of subtractors for calculating differences between outputs of the first power calculation sections and outputs of the second power calculation sections for the individual sub-bands, a first priority order determination section for determining a first priority order based on outputs of the subtractors, a second priority order determination section for determining a second priority order based on outputs of the power calculation sections, and a third priority order determination section for determining a final priority order based on the first priority order and the second priority order.

The band information calculation section estimates influences of echoes upon the sub-bands based on the input signal and the reception signal to determine a priority order. The estimation of influences of echoes is performed so that a higher priority may be provided to a sub-band which is considered to provide a higher feeling of echoes on an auditory sense. Each of the adaptive filters determines processing to be executed thereby in accordance with the priority order provided from the band information calculation section. In particular, an adaptive filter of a sub-band having a high priority performs complicated processing which exhibits a high echo suppression effect, but another adaptive filter of another sub-band having a low priority performs simple processing.

Thus, with the acoustic echo canceler, since influences of echoes are estimated for the individual sub-bands to determine a priority order and each adaptive filter determines processing to be executed thereby based on the priority order, processing with a characteristic on an auditory sense taken into consideration is performed and a good speech quality can be provided.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
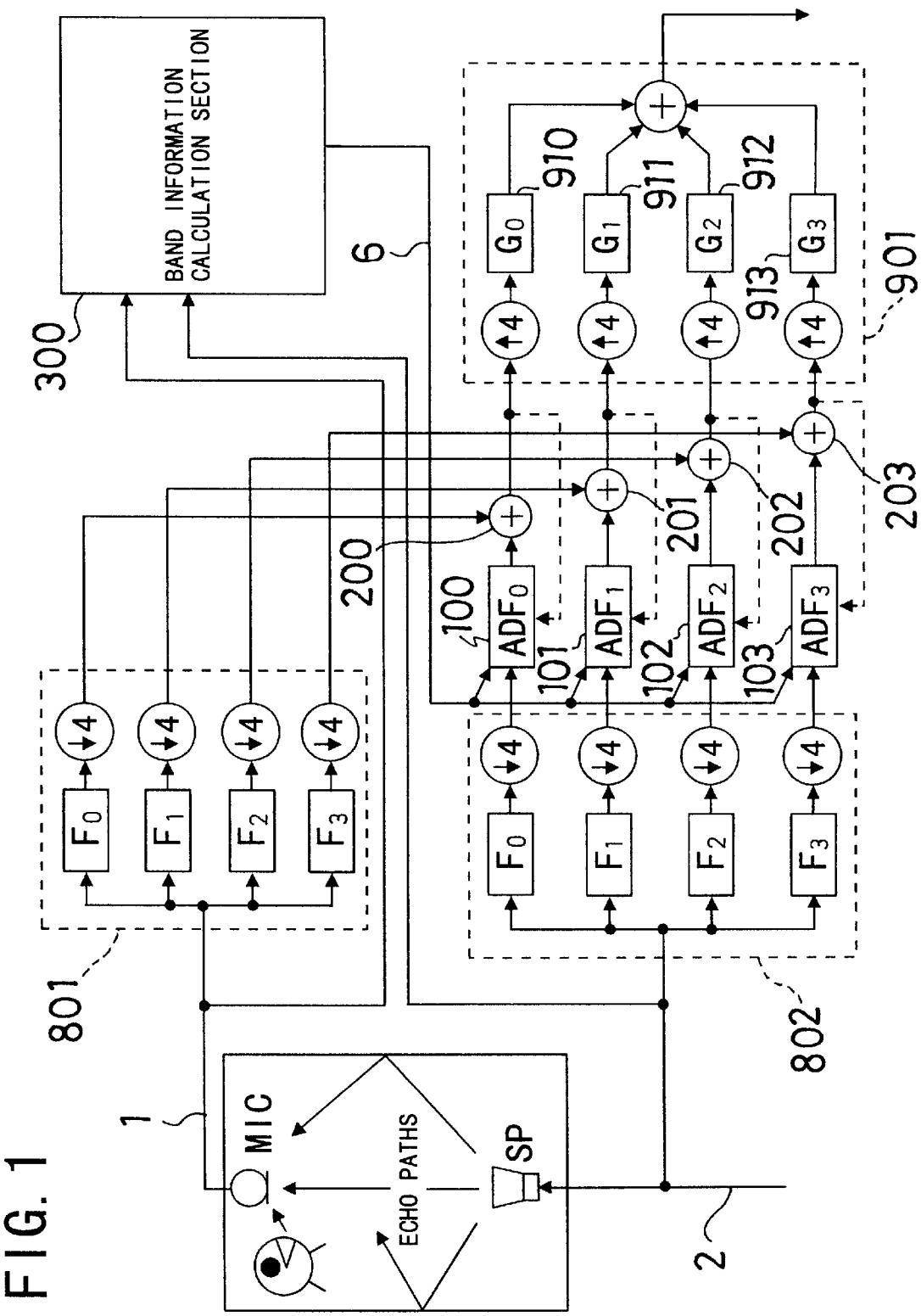
FIG. 1 is a block diagram of an acoustic echo canceler showing a first preferred embodiment of the present invention.
Figure 2:
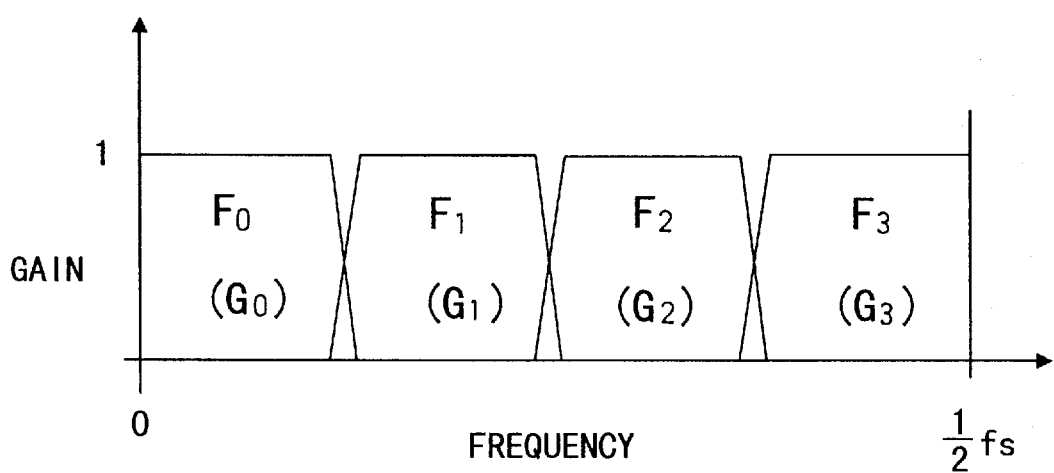
FIG. 2 is a graph illustrating a frequency characteristic of a filter used in an analysis filter bank shown in FIG. 1.
Figure 7:
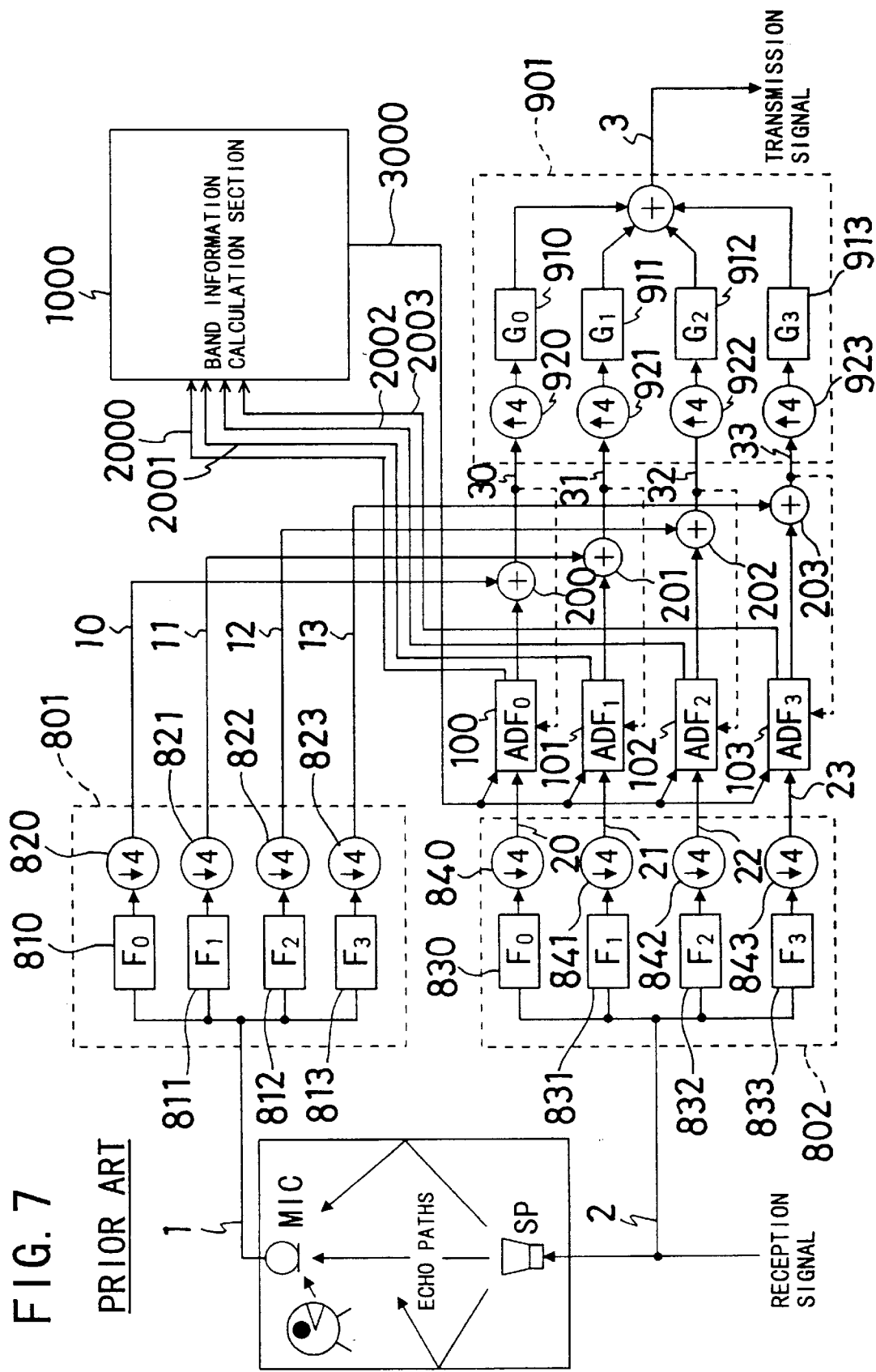
FIG. 7 is a block diagram of a conventional sub-band echo canceler.

Referring first to FIG. 1, there is shown an acoustic echo canceler according to a first preferred embodiment of the present invention. The acoustic echo canceler is an improvement to and has a basically similar construction to that of the conventional acoustic echo canceler described hereinabove with reference to FIG. 7. The acoustic echo canceler of the present embodiment is different from the conventional acoustic echo canceler in that it includes, in place of the adaptive filter tap allocation control section 1000, a band information calculation section 300 which receives an input signal 1 from a microphone MIC and a reception signal 2 and outputs a control signal 6 to adaptive filters 100 to 103. The band information calculation section 300 refers to the input signal 1 from the microphone MIC and the reception signal 2 to apply a priority order to four sub-bands divided by analysis filter banks 801 and 802. This priority order is determined such that the highest priority is provided to one of the sub-bands on which the influence of echoes is highest while the lowest priority is provided to another one of the sub-bands on which the influence of echoes is lowest. It is to be noted that filters of the analysis filter banks 801 and 802 are prepared so that an entire acoustic signal band may be divided appropriately (this similarly applies to band-pass filters 910 to 913 of a synthesis filter bank 901). This frequency characteristic can be represented diagrammatically as seen in FIG. 2. The division number of the band, however, is not limited to 4 as in FIG. 2, or such division need not be performed equally.

The band information calculation section 300 outputs a control signal 6 based on the priority order to the adaptive filters 100 to 103. In particular, the band information calculation section 300 outputs a control signal 6 to one of the adaptive filters which corresponds to a sub-band which has a high priority so that processing (an algorithm) having a high echo suppression performance may be executed although the calculation is complicated, but to another adaptive filter which corresponds to another sub-band which has a low priority so that processing in which the calculation is simple (least but necessary processing) may be executed.

In this manner, in the present embodiment, an echo suppression effect according to an amount of calculation can be obtained by performing complicated processing for a sub-band on which the influence of echoes is high but performing simple processing for another sub-band on which the influence of echoes is low.

Figure 3:
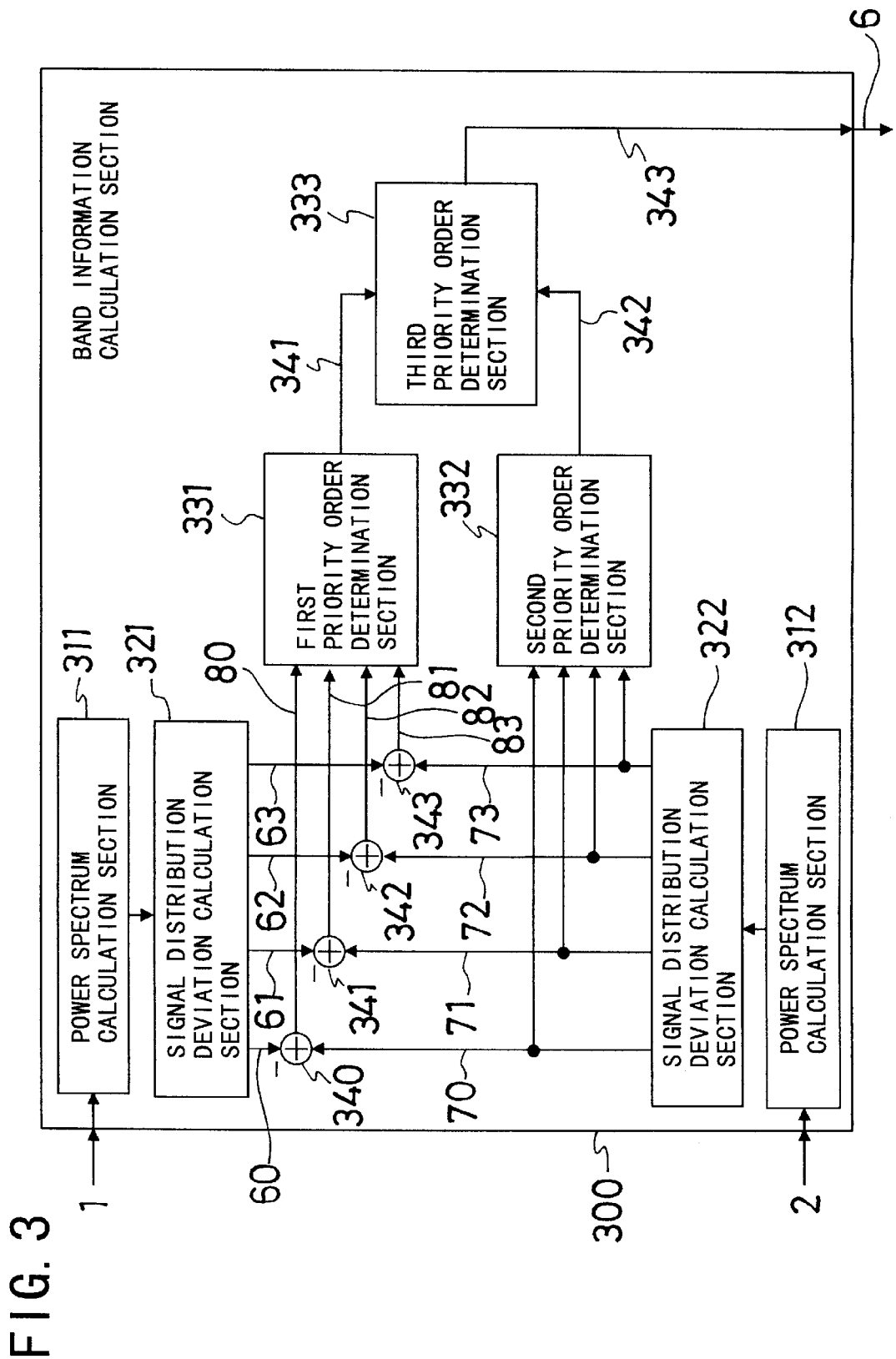
FIG. 3 is a block diagram showing an example of a band information calculation section shown in FIG. 1.

The band information calculation section 300 can be realized, for example, by a construction shown in FIG. 3. Referring to FIG. 3, the band information calculation section 300 shown includes a pair of power spectrum calculation sections 311 and 312 which correspond to the input signal 1 inputted from the microphone MIC and the reception signal 2, respectively, a pair of signal distribution deviation calculation sections 321 and 322 connected to the power spectrum calculation sections 311 and 312, respectively, subtractors 340 to 343 connected to both of the signal distribution deviation calculation sections 321 and 322, a first priority order determination section 331 connected to the subtractors 340 to 343, a second priority order determination section 332 connected to the signal distribution deviation calculation section 322, and a third priority order determination section 333 connected to the first and second priority order determination sections 331 and 332.

Operation of the band information calculation section 300 is described below. First, the power spectrum calculation sections 311 calculates a power spectrum of the input signal 1 from the microphone MIC and supplies the thus calculated power spectrum data to the signal distribution deviation calculation section 321. From the power spectrum data supplied, the signal distribution deviation calculation section 321 calculates energies corresponding to frequencies of the input signal 1 from the microphone MIC (an energy distribution on the frequency axis) for individual sub-bands of the filter bank 801.

Similarly, the power spectrum calculation section 312 calculates a power spectrum of the reception signal 2 inputted thereto and supplies the thus calculated power spectrum data to the signal distribution deviation calculation section 322. From the power spectrum data supplied, the signal distribution deviation calculation section 322 calculates energies corresponding to frequencies of the reception signal 2 for the individual sub-bands of the analysis filter bank 802.

The energy distribution data 60 to 63 calculated by the signal distribution deviation calculation sections 321 are supplied to the subtractors 340 to 343, respectively. Meanwhile, the energy distribution data 70 to 73 calculated by the signal distribution deviation calculation section 32 2 are supplied to the subtractors 340 to 343, respectively, and also to the second priority order determination section 332. The subtractors 340 to 343 calculate differences between the energy distribution data 60 to 63 and the energy distribution data 70 to 73, respectively, and supply the difference data 80 to 83 to the first priority order determination section 331.

The first priority order determination section 331 determines a priority order based on the difference data 80 to 83 supplied thereto so that the sub-bands have a descending order in energy distribution such that the sub-band having the highest energy (the sub-band in which the reception signal energy is higher than the input signal energy) may have the highest priority, and supplies the priority order data 341 to the third priority order determination section 333. Meanwhile, the second priority order determination section 332 determines a priority order based on the energy distribution data 70 to 73 given thereto so that the sub-bands may have a descending order in energy distribution, and supplies the priority order data 342 to the third priority order determination section 333.

The third priority order determination section 333 adopts the priority order data 342 from the second priority order determination section 332 once. Thereafter, the third priority order determination section 333 refers to the priority order data 341 from the first priority order determination section 331 to re-examine the priority order data 342 adopted once. Then, the third priority order determination section 333 determines a final priority order. For example, the third priority order determination section 333 provides first scores to the individual sub-bands based on the priority order data 342. The scores have higher values in accordance with the priorities thereof. Similarly, the third priority order determination section 333 provides second scores to the sub-bands based on the priority order data 341. Then, the third priority order determination section 333 adds the first scores and the second scores for the individual sub-bands and determines a final priority order of the sub-bands in accordance with the sum values of them so that the sub-bands may have a descending order in sum value. As an example, if it is assumed that first scores of (4:3:2:1) are provided to bands 1, 2, 3 and 4 in this order while second scores of (2:4:3:1) are provided to them, then the sum values of them are (6:7:5:2), respectively. Accordingly, in this instance, the final priority order is determined as the order of the bands 2, 1, 3 and 4. It is to be noted that, where some two sum values of the first and second scores are equal to each other, then the priority order between them is determined based on the first score. Or, the first scores and the second scores may be weighted by multiplying them by different arbitrary parameters.

The priority order data 343 representative of the priority order determined by the third priority order determination section 333 in this manner are supplied as a control signal 6 to the adaptive filters 100 to 103.

Each of the adaptive filters 100 to 103 determines an algorithm to be executed thereby based on the priority order data 343. The algorithms based on the priority order may be, for example, such as given in Table 1 below.

TABLE 1

| Priority | Algorithm |
| --- | --- |
| 1 | Affine projection algorithm |
| 2 | Normalized LMS algorithm (coefficients updated at each sampling time |
| 3 | Normalized LMS algorithm (coefficients updated at each N sampling times |
| 4 | Normalized LMS algorithm (coefficients updated at each N sampling times |

N: positive parameter

It is to be noted that, in the example of Table 1 above, the same processing is performed for the sub-bands of the priority order numbers 3 and 4.

Figure 4:
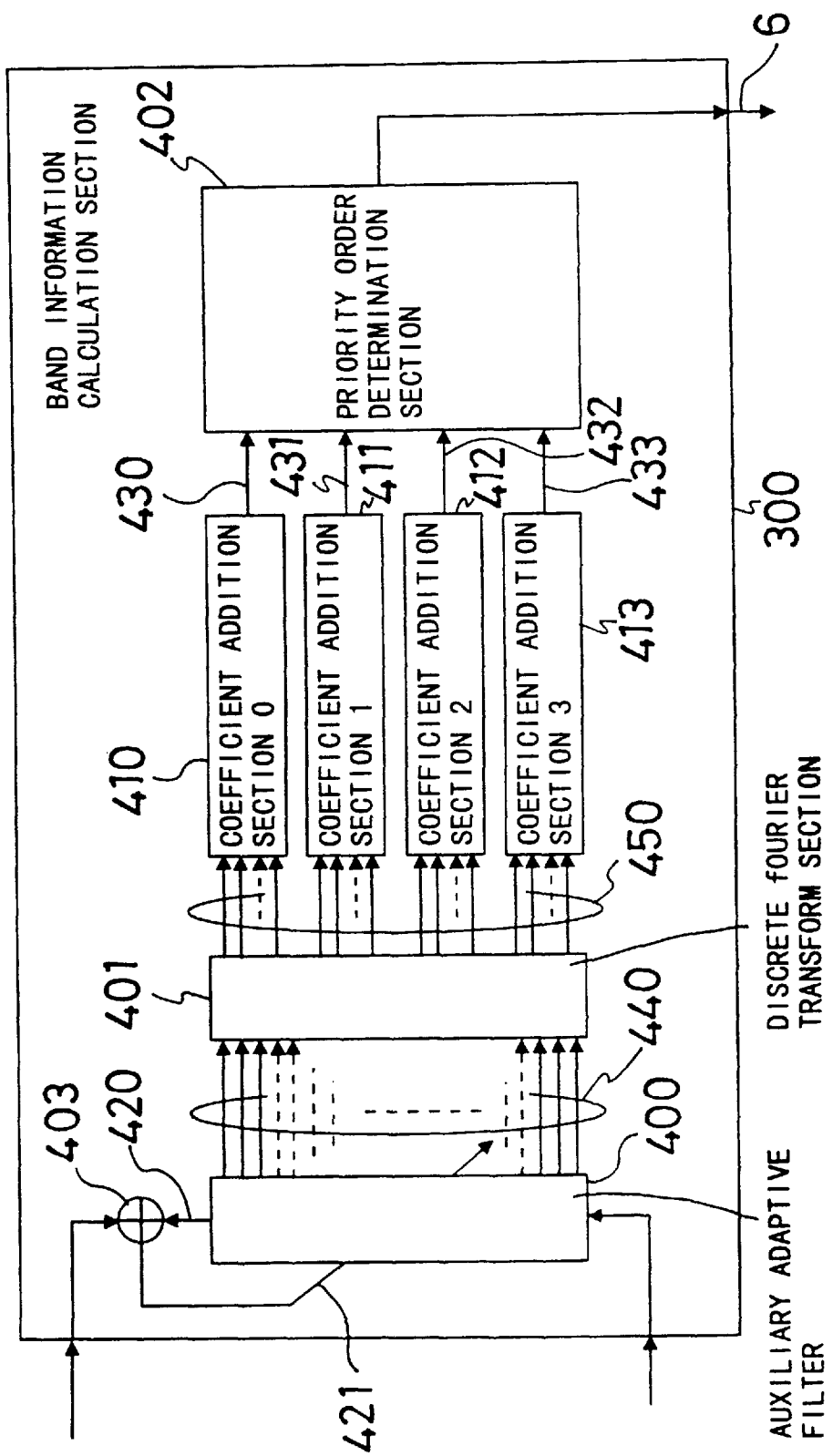
FIG. 4 is a block diagram showing another example of the band information calculation section shown in FIG. 1.

Or, the band information calculation section 300 may alternatively be constructed in such a manner as shown in FIG. 4. In particular, referring to FIG. 4, the band information calculation section 300 shown includes an auxiliary adaptive filter 400, a discrete Fourier transform section 401, coefficient addition sections 410 to 413, a priority order determination section 402 and a subtractor 403.

Operation of the band information calculation section 300 shown in FIG. 4 is described. The auxiliary adaptive filter 400 produces an error echo signal 420 from the reception signal 2 inputted thereto and outputs the error echo signal 420 to the subtractor 403. The subtractor 403 subtracts the error echo signal 420 from the input signal 1 from the microphone MIC and supplies a subtraction result 421 to the auxiliary adaptive filter 400. The auxiliary adaptive filter 400 refers to the subtraction result 421 to update filter coefficients. The auxiliary adaptive filter 400 successively performs the operation described above and supplies adaptive filter coefficients 440 to the discrete Fourier transform section 401.

The discrete Fourier transform section 401 Fourier transforms the adaptive filter coefficients 440 supplied thereto and supplies Fourier coefficients 450 to the coefficient addition sections 410 to 413. Here, the coefficient addition sections 410 to 413 correspond to the band-pass filters 810 to 813 (830 to 833) of the filter bank 801 (802), and also supply of the Fourier coefficients 450 is performed corresponding to sub-bands.

The coefficient addition sections 410 to 413 add the Fourier series supplied thereto and supplies addition results 430 to 433 to the priority order determination section 402.

The priority order determination section 402 applies a priority order to the sub-bands in accordance with a descending order of the addition results (addition coefficients) to produce priority order data and outputs the priority order data as a control signal 6 to the adaptive filters 100 to 103.

Consequently, each of the adaptive filters 100 to 103 can determine an algorithm to be executed thereby based on the priority order data by the band information calculation section 300 of FIG. 4 similarly as in the band information calculation section 300 of FIG. 3.

Figure 5:
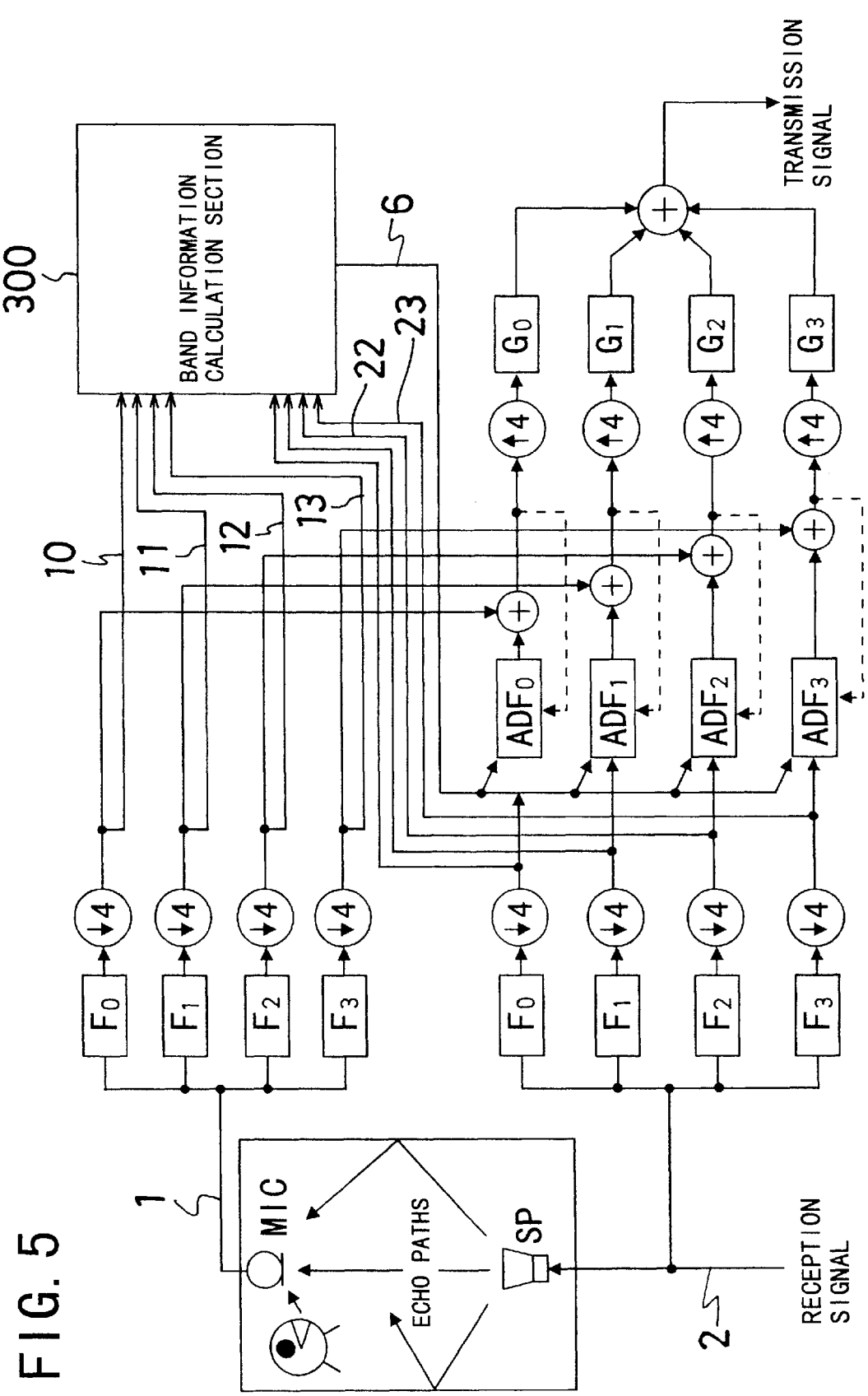
FIG. 5 is a block diagram of another acoustic echo canceler showing a second preferred embodiment of the present invention.

Referring now to FIG. 5, there is shown another acoustic echo canceler to which the present invention is applied. The acoustic echo canceler is a modification to the acoustic echo canceler of the first embodiment described above and is different in the band information calculation section 300. In particular, in the acoustic echo canceler of the present embodiment, the band information calculation section 300 receives sub-band signals 10 to 13 and 20 to 23 obtained by band division by the analysis filter banks 801 and 802 and outputs a control signal 6 to the adaptive filters 100 to 103.

The band information calculation section 300 refers to the sub-band signals 10 to 13 and 20 to 23 inputted thereto to apply a priority order to the four sub-bands in accordance with a descending order of the degree of an influence of echoes and causes the adaptive filters 100 to 103 to execute processing based on the priority order. It is to be noted that complicated calculation is performed by an adaptive filter for a sub-band which has a comparatively high priority while simple calculation is performed by another adaptive filter for a sub-band which has a comparatively low priority, similarly as in the acoustic echo canceler of the first embodiment described hereinabove.

Figure 6:
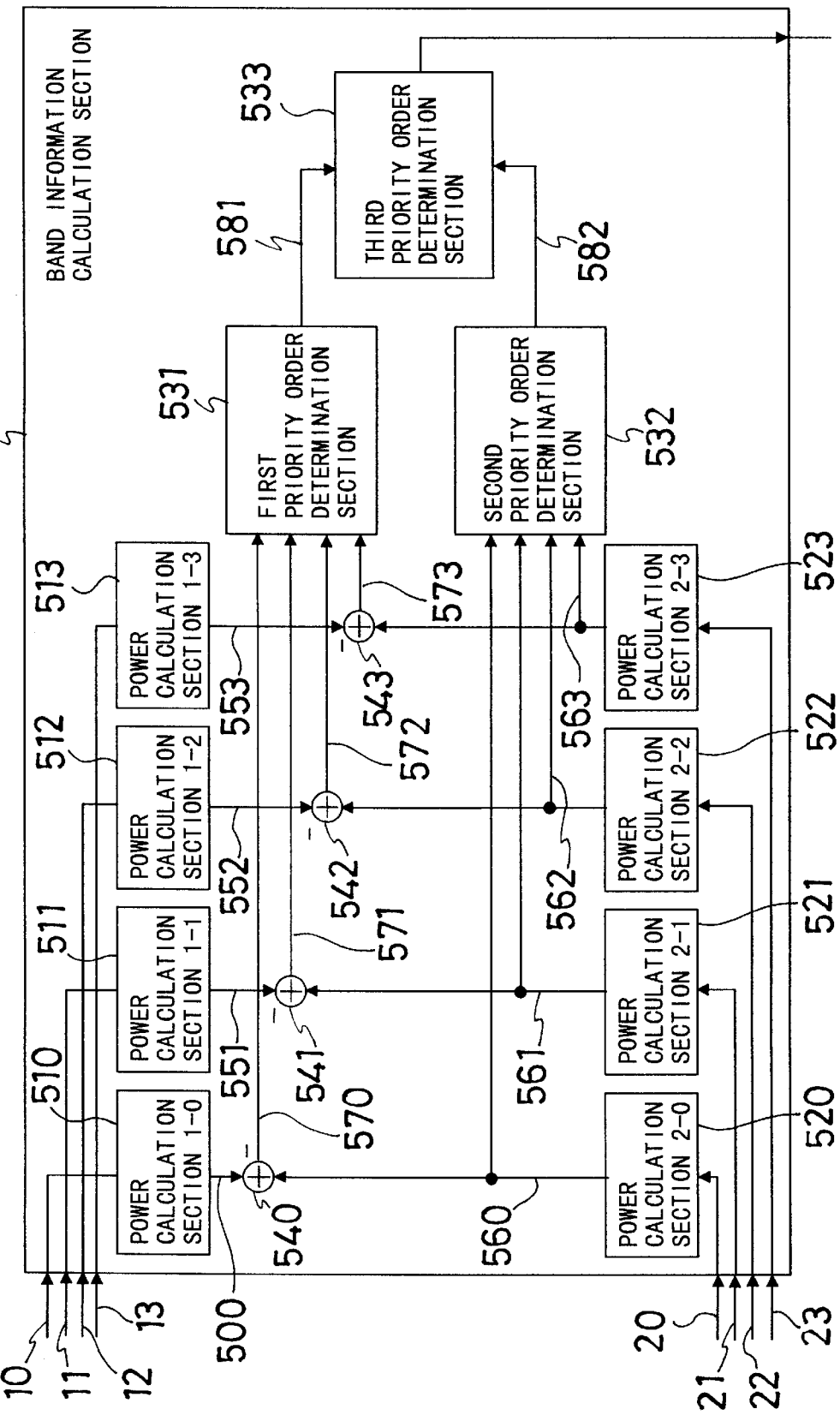
FIG. 6 is a block diagram showing an example of a band information calculation section shown in FIG. 5.

The band information calculation section 300 described above is constructed, for example, in such a manner as shown in FIG. 6. Referring to FIG. 6, the band information calculation section 300 shown includes power calculation sections 510 to 513 and 520 to 523 to which the sub-band signals 10 to 13 and 20 to 23 are inputted, respectively, first to third priority order determination sections 531 to 533, and subtractors 540 to 543.

Operation of the band information calculation section 300 is described below. First, the power calculation sections 510 to 513 calculate power values 550 to 553 of the sub-band signals 10 to 13 inputted thereto and output the power values 550 to 553 to the subtractors 540 to 543, respectively. Further, the power calculation sections 520 to 523 calculate power values 560 to 563 of the sub-band signals 20 to 23 inputted thereto and output the power values 560 to 563 to the subtractors 540 to 543, respectively, and also to the second priority order determination section 532.

The subtractors 540 to 543 calculate the differences between the power values 550 to 553 and the power values 560 to 563 and output difference power values 570 to 573 to the first priority order determination section 531.

Based on the difference power values 570 to 573 inputted, the first priority order determination section 531 applies a priority order to the sub-bands in accordance with a descending order of the power differences, and supplies priority order data 581 to the third priority order determination section 533. Similarly, the second priority order determination section 532 applies, based on the power values 560 to 563 inputted thereto, a priority order to the sub-bands in accordance with a descending order of the power values, and supplies priority order data 582 to the third priority order determination section 533.

The third priority order determination section 533 first adopts, similarly as in the arrangement of FIG. 3, the priority order of the sub-bands according to the priority order data 582 from the second priority order determination section 532 and then refers to the priority order data 581 from the first priority order determination section 531 to perform re-examination of the priority order adopted once to determine a final priority order. Priority order data representative of the priority order determined in this manner are supplied as a control signal 6 to the adaptive filters 100 to 103 corresponding to the individual sub-bands.

Each of the adaptive filters 100 to 103 determines an algorithm to be executed thereby in accordance with the control signal 6.

In this manner, also in the present embodiment, similarly as in the first embodiment described above, by performing complicated processing for a sub-band on which the influence of echoes is high while simple processing is performed for another sub-band on which the influence of echoes is low, an echo suppression effect in accordance with a calculation amount can be obtained.

Having now fully described the invention, it will be apparent to one of ordinary skill in the art that many changes and modifications can be made thereto without departing from the spirit and scope of the invention as set forth herein.

What is claimed is:

1. An acoustic echo canceler, comprising:
   a first analysis filter bank for dividing a reception signal to be converted into an acoustic signal by a loudspeaker into a plurality of sub-bands;
   a plurality of adaptive filters for individually producing false echo signals from the reception signal after division of the reception signal into the sub-bands by said first analysis filter bank;
   a second analysis filter bank for dividing an input signal from a microphone, which is provided at a position at which said microphone can detect the acoustic signal as echoes, into a plurality of sub-bands same as the first-mentioned sub-bands;
   a plurality of subtractors for subtracting the false echo signals corresponding to the sub-bands from the input signal after division of the input signal into the sub-bands by said second analysis filter bank;

a synthesis filter bank for synthesizing outputs of said subtractors; and a band information calculation section receiving the reception signal and the input signal, estimating influences of the echoes for the individual sub-bands based on the received reception signal and input signal, and determining a priority order based on the estimation;

each of said adaptive filters determining processing to be executed thereby based on the priority order.

2. An acoustic echo canceler as claimed in claim 1, wherein one of said adaptive filters which has a high priority based on the priority order executes processing which is more complicated and has a higher echo suppression effect than another one of said adaptive filters which has a lower priority based on the priority order.

3. An acoustic echo canceler as claimed in claim 1, wherein said band information calculation section receives directly both the reception signal and the input signal, and effects estimation based on the directly-received reception signal and the directly-received input signal.

4. An acoustic echo canceler, comprising:

a first analysis filter bank for dividing a reception signal to be converted into an acoustic signal by a loudspeaker into a plurality of sub-bands;

a plurality of adaptive filters for individually producing false echo signals from the reception signal after division into the sub-bands by said first analysis filter bank;

a second analysis filter bank for dividing an input signal from a microphone, which is provided at a position at which said microphone can detect the acoustic signal as echoes, into a plurality of sub-bands same as the first-mentioned sub-bands;

a plurality of subtractors for subtracting the false echo signals corresponding to the sub-bands from the input signal after division into the sub-bands by said second analysis filter bank;

a synthesis filter bank for synthesizing outputs of said subtractors; and a band information calculation section for estimating influences of the echoes for the individual sub-bands and determining a priority order based on the estimation;

each of said adaptive filters determining processing to be executed thereby based on the priority order;

wherein said band information calculation section includes a first power spectrum calculation section for calculating a power spectrum of the input signal, a second power spectrum calculation section for calculating a power spectrum of the reception signal, a first signal distribution deviation calculation section for calculating a distribution of energy of the input signal for the individual sub-bands based on an output of said first power spectrum calculation section, a second signal distribution deviation calculation section for calculating a distribution of energy of the reception signal for the individual sub-bands based on an output of said second power spectrum calculation section, a plurality of subtractors for calculating differences between the energy of the input signal and the energy of the reception signal for the individual sub-bands, a first priority order determination section for determining a first priority order based on outputs of said subtractors, a second priority order determination section for determining a second priority order based on outputs of said second signal distribution deviation calculation section, and a third priority order determination section for determining a final priority order based on the first priority order and the second priority order.

5. An acoustic echo canceler as claimed in claim 4, wherein said first priority order determination section applies a priority order to the sub-bands in a descending order of the energy of the input signal beginning with one of the sub-bands with which energy of the input signal is higher than energy of the reception signal to determine the first priority order while said second priority order determination section applies a priority order to the sub-bands in a descending order of the energy of the reception signal to determine a second priority order, and said third priority order determination section refers to the first priority order to correct the second priority order to determine a final priority order.

6. An acoustic echo canceler, comprising:

a first analysis filter bank for dividing a reception signal to be converted into an acoustic signal by a loudspeaker into a plurality of sub-bands;

a plurality of adaptive filters for individually producing false echo signals from the reception signal after division into the sub-bands by said first analysis filter bank;

a second analysis filter bank for dividing an input signal from a microphone, which is provided at a position at which said microphone can detect the acoustic signal as echoes, into a plurality of sub-bands same as the first-mentioned sub-bands;

a plurality of subtractors for subtracting the false echo signals corresponding to the sub-bands from the input signal after division into the sub-bands by said second analysis filter bank;

a synthesis filter bank for synthesizing outputs of said subtractors; and a band information calculation section for estimating influences of the echoes for the individual sub-bands and determining a priority order based on the estimation;

each of said adaptive filters determining processing to be executed thereby based on the priority order, wherein said band information calculation section includes a subtractor for calculating a difference between the input signal and a second error echo signal different from the first-mentioned error echo signal, an auxiliary adaptive filter for referring to an output of said subtractor to update the filter coefficients and producing the second error echo signal from the reception signal, a discrete Fourier transform section for discrete Fourier transforming the filter coefficients, a plurality of coefficient addition sections for adding outputs of said discrete Fourier transform section for the individual sub-bands, and a priority order determination section for determining a priority order based on outputs of said coefficient addition sections.

7. An acoustic echo canceler as claimed in claim 6, wherein said priority order determination section determines a priority order to the sub-bands in a descending order of the outputs of said coefficient addition sections.

8. An acoustic echo canceler as claimed in claim 1, wherein said band information calculation section effects estimation based on the input signal after division of the input signal into the sub-bands and the reception signal after division of the reception signal into the sub-bands.

9. An acoustic echo canceler, comprising:

a first analysis filter bank for dividing a reception signal to be converted into an acoustic signal by a loudspeaker into a plurality of sub-bands;

a plurality of adaptive filters for individually producing false echo signals from the reception signal after division into the sub-bands by said first analysis filter bank;

a second analysis filter bank for dividing an input signal from a microphone, which is provided at a position at which said microphone can detect the acoustic signal as echoes, into a plurality of sub-bands same as the first-mentioned sub-bands;

a plurality of subtractors for subtracting the false echo signals corresponding to the sub-bands from the input signal after division into the sub-bands by said second analysis filter bank;

a synthesis filter bank for synthesizing outputs of said subtractors; and a band information calculation section for estimating influences of the echoes for the individual sub-bands and determining a priority order based on the estimation;

each of said adaptive filters determining processing to be executed thereby based on the priority order, wherein said band information calculation section includes a plurality of first power calculation sections for individually calculating powers of the input signal after division of the input signal into the sub-bands, a plurality of second power calculation sections for individually calculating powers of the reception signal after division of the reception signal into the sub-bands, a plurality of subtractors for calculating differences between outputs of said first power calculation sections and outputs of said second power calculation sections for the individual sub-bands, a first priority order determination section for determining a first priority order based on outputs of said subtractors, a second priority order determination section for determining a second priority order based on outputs of said power calculation sections, and a third priority order determination section for determining a final priority order based on the first priority order and the second priority order.

10. An acoustic echo canceler as claimed in claim 9, wherein said first priority order determination section applies a priority order to the sub-bands in a descending order of the differences beginning with one of the sub-bands with which the output of the second power calculation section is higher than the output of the first power calculation section to determine the first priority order while said second priority order determination section applies a priority order to the sub-bands in a descending order of the outputs of said second power calculation sections to determine the second priority order, and said third priority order determination section refers to the first priority order to correct the second priority order to determine the final priority order.

* * * * *